United States Patent
Groganz et al.

(10) Patent No.: US 9,568,898 B2
(45) Date of Patent: Feb. 14, 2017

(54) AUTOMATION SYSTEM AND METHOD FOR AUTOMATED ADAPTATION OF A POWER PLANT CONTROL

(75) Inventors: Julian Groganz, Karlsruhe (DE); Joachim Rupp, Stutensee (DE); Klaus Wendelberger, St. Leon-Rot (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 480 days.

(21) Appl. No.: 14/232,280

(22) PCT Filed: Apr. 11, 2012

(86) PCT No.: PCT/EP2012/056496
§ 371 (c)(1),
(2), (4) Date: Feb. 8, 2014

(87) PCT Pub. No.: WO2013/007405
PCT Pub. Date: Jan. 17, 2013

(65) Prior Publication Data
US 2014/0156092 A1  Jun. 5, 2014

(30) Foreign Application Priority Data
Jul. 13, 2011  (DE) .......... 10 2011 079 107

(51) Int. Cl.
G06F 19/00 (2011.01)
G06F 17/00 (2006.01)
G05B 13/04 (2006.01)

(52) U.S. Cl.
CPC ............ G05B 13/04 (2013.01); G05B 13/042 (2013.01)

(58) Field of Classification Search
None
See application file for complete search history.

(56) References Cited

U.S. PATENT DOCUMENTS 4,628,462 A * 12/1986 Putman .................. F01K 17/02
                                                60/660
5,148,362 A *  9/1992 Braun .................... H02J 3/26
                                                363/37
(Continued)

FOREIGN PATENT DOCUMENTS

CN      1328661 A    12/2001
CN    101044663 A     9/2007
(Continued)

OTHER PUBLICATIONS

Lin et al. Information Science and Technology; Lin Xinli, The Algorithm Research on the Online Decoupling of the Neural Network the abstract pp. 14-17, 48-51.
(Continued)

Primary Examiner — Wissam Rashid
(74) Attorney, Agent, or Firm — Beusse Wolter Sanks & Maire

(57) ABSTRACT

An automatic adaptation of a control of a technical system, in particular of a power plant, is provided. Control circuits are created for controlling the technical system, wherein at least one control circuit and a second control circuit are coupled using a decoupling member. The decoupling member has at least one adaptable parameter. The at least one adaptable parameter of the decoupling member is automatically adapted in an online operation of the technical system to an actual, dynamic process behavior of the technical system, i.e., automatic online adaptation.

19 Claims, 3 Drawing Sheets

(56) References Cited

U.S. PATENT DOCUMENTS

| | | | | |
|---|---|---|---|---|
| 5,268,834 | A * | 12/1993 | Sanner | G05B 13/047 |
| | | | | 700/31 |
| 5,400,247 | A * | 3/1995 | He | D21G 9/0009 |
| | | | | 162/262 |
| 6,571,135 | B2 | 5/2003 | Bergold | |
| 2003/0169121 | A1 * | 9/2003 | Grebenkemper | G06F 17/5036 |
| | | | | 333/12 |

FOREIGN PATENT DOCUMENTS

| | | |
|---|---|---|
| CN | 101158846 A | 4/2008 |
| CN | 101221586 A | 7/2008 |
| CN | 101793530 A | 8/2010 |
| DE | 19501077 | 7/1996 |
| EP | 1488863 | 12/2004 |

OTHER PUBLICATIONS

Chen et al. The Application Study for Coordinated Control System of Fuzzy Multi-model based on Dynamic Decoupling; Proceedings of the CSEE>, vol. 26, No. 12; pp. 166-170.

Liu et al. Multi-motor Synchronous System Based on Neural Network Decoupling Control; Proceedings of the 27th Chinese Control Conference; pp. 257-260.

* cited by examiner

AUTOMATION SYSTEM AND METHOD FOR AUTOMATED ADAPTATION OF A POWER PLANT CONTROL

CROSS REFERENCE TO RELATED APPLICATIONS

This application is the US National Stage of International Application No. PCT/EP2012/056496 filed Apr. 11, 2012, and claims the benefit thereof. The International Application claims the benefit of German Application No. DE 102011079107.8 filed Jul. 13, 2011. All of the applications are incorporated by reference herein in their entirety.

FIELD OF INVENTION

The invention relates to a method for the automatic adaptation of a control of a technical plant, in particular a power plant, and an automation system with a control of a technical plant.

BACKGROUND OF INVENTION

Automation systems are normally used for an automation, in particular an automated control and/or regulation, of industrial processes in technical plants, such as, for example steam power plants.

Automation systems of this type for technical plants, which are available in the form of software implemented in control systems, contain—in the form of single-loop or multi-loop control circuits—control systems by means of which the industrial processes can be mapped in these technical plants—usually at subsystem level—and by means of which the technical plant is run in a regulated/controlled manner by means of actuating elements/units controlled by the control systems.

Such a, for example single-loop, control circuit is made up of an analog measurement of a process variable (control variable) to be regulated and an input of the measured process variable into the automation system via an analog/digital (A/D) conversion. Furthermore, the control circuit usually provides a filter with which a noise of the measured process variable is eliminated. The control circuit specifies a desired value (target value) for the process variable and forms a deviation of the control variable from the desired value (control difference). From the control difference, a control algorithm (controller) determines how an actuating element/unit is to behave so that the control variable approximates the target value (actuating signal). The actuating signal is output via a digital/analog (D/A) conversion to the actuating element/unit of the technical system.

Moreover, when control circuits of this type are set up, control circuit parameters, such as transmission elements, time constants and/or amplification factors must be selected or set by the user.

For the automation of a subsystem of a technical plant, for example a steam power plant block in a steam power plant, it is necessary to set up a multiplicity of control circuits of this type for this subsystem that is to be automated.

The control circuits of the subsystem, for example a steam power plant block, are not independent from one another, but rather are strongly interlinked—due to industrial process circumstances (process engineering).

For example, the control of a pressure in a furnace of the steam power plant block via an induced draft is strongly influenced by the control of a fresh air feed via the forced-draft fan in the steam power plant block. Also, an increased fuel mass flow in the steam power plant block not only results in an increased steam production, but also influences the steam temperature in the steam power plant block which is to be kept constant by means of injections. The control of the feed water mass flow by means of the feed pump and the control of the feed water pressure by means of the feed water control valve are also dependent on one another.

In order to be able to achieve a high control quality and a high system stability, process-engineering-related (cross-) couplings of this type must again be decoupled or separated in the control engineering in the subsystem considered.

This is done via control engineering through the use of so-called decoupling networks with decoupling branches in the control structures or between the control circuits. These decoupling branches contain so-called decoupling elements, for example DT1 derivative lag elements and/or PTn delay elements.

Depending on the type of process engineering coupling actually present, decoupling must be carried out with a delay element or derivative lag element.

Via a derivative lag/delay branch with a derivative lag/delay element, a control difference of a specific process variable then no longer acts only on the actuating element allocated to it, but also on the actuating element of the coupled control circuit.

Due to the coordinated action with a plurality of actuating elements, it can be ensured that only the one process variable, instantaneously affected by a control difference, is influenced, and the other (process-engineering-coupled) process variables can remain at their desired value or deviate as little as possible and from the latter.

A design, i.e. a parameterization, of the decoupling branches is dependent on an actual dynamic process behavior of the systems considered, and must be carried out during a commissioning of the power plant control.

Plant tests are carried out during the parameterization. The evaluation of the test results then provides an insight into the parameters that are to be modified and to what extent. The parameters are then manually adjusted until the control achieves an optimum decoupling. The parameterization is laborious (time-consuming) and correspondingly expensive.

In the test performance period, the technical plant, for example the steam power plant, cannot be operated economically, for example at low cost according to a current power requirement of an electricity grid to be supplied with electric power by the steam power plant.

The dynamic response of the process is normally dependent on the current operating condition of the plant, so that the parameterization must be carried out in or for a plurality of operating points.

In addition, the dynamic behavior of the technical plant, and also the power plant process, will change due to the use of different fuel types, through wear, contamination and the like over time.

The decoupling branches, which have been set once to a specific plant behavior, then become no longer optimal with time. The control behavior will therefore deteriorate with time, and the stability of the plant will decrease.

On the basis thereof, the need therefore exists for a plant control which is simple to set up for coupled multivariable systems.

A so-called multivariable control for coupled multivariable system is known in the prior art.

In multivariable control, a complete system, such as a technical plant or only a subsystem of the technical plant, is considered with a plurality of control variables and a plurality of actuating elements. Here, every actuating element can—theoretically—act on every control variable, whereby a—theoretical—multi-dimensional process engineering coupling of processes can be taken into account in the subsystem.

A coupled multivariable system can thus be simulated in/by a multivariable control of this type.

If a multivariable controller is designed for a coupled multivariable system, decoupling structures are therefore also automatically generated.

However, a multivariable controller or multivariable control of this type has one or more of the following disadvantages which make it unsuitable for the control of technical plants, such as power plants.

The multivariable controller is based on a mathematical algorithm which cannot be represented in a function plan of a power plant control system. It is therefore not transparent and therefore not maintainable for a plant operator, i.e. is not modifiable and not extendable.

The result of the lacking transparency of the multivariable controller is furthermore that a commissioning engineer does not have the facility to set up additional structures with which special operating conditions can be taken into account.

However, non-linear boundary conditions of this type, such as, for example, limit curves of a pump, occur in every technical plant.

The multivariable controller can be designed once for a specific process structure and process dynamic response in the technical plant. However, it is not capable of adapting automatically to constantly changing boundary conditions.

The multivariable controller itself has parameters which are definable only with difficulty, in some cases only using a special tool. A targeted and desired reduction in the commissioning outlay cannot therefore be achieved.

The implementation of a multivariable controller additionally entails a high computing outlay and storage space requirement, and cannot therefore be used in an automation system, in particular in a power plant control system.

Since these disadvantages of multivariable controllers make their use unsuitable in the automation of technical plants or in power plant control systems, the use of single-loop control circuits with decoupling branches and the performance of plant tests for the parameterization of the decoupling elements is current practice.

Manual parameterization is currently restricted to the use of low-order decoupling elements, as there would otherwise be too many parameters to be set in the plant tests, which would ultimately be unmanageable in practice.

However, a lower control quality must in some cases be accepted as a result, since a higher-order decoupling element which is possibly more suitable in terms of control engineering could not be set manually.

It is furthermore known to implement automation systems, in particular plant engineering controls and/or regulations—mostly in the form of software—in a control system of a plant.

A control system, in particular a process control system, of a plant therefore normally designates means and methods which serve to control, regulate and secure such a process engineering plant.

SUMMARY OF INVENTION

An object herein is to produce a method for creating a control of a technical plant and an automation system with a control for a technical plant which overcome the described disadvantages in the prior art.

In particular, on the one hand, embodiments herein are adapted to reduce the outlay for the commissioning of power plant control circuits and, on the other hand, to increase a long-term stability of the technical plant.

Furthermore, an object of the invention is to produce a method for creating a control of a technical plant and an automation system with a control for a technical plant which enable parameters of decoupling branches to be automatically adapted in an online operation to the dynamic behavior of plant engineering processes.

These objects are achieved by a method for the automatic adaptation of a control of a technical plant, in particular a power plant, and by an automation system with a control for a technical plant.

The automation system according to the invention is particularly suitable for carrying out the method according to the invention or one of its further developments described below, and also the method according to the invention is particularly suitable for being carried out on the automation system according to the invention or one of its further developments described below.

Preferred further developments of the invention are also described in the dependent claims. The further developments relate to both the method according to the invention and the automation system according to the invention.

The invention and the described embodiments can be implemented in both software and hardware, for example using a special electrical circuit.

Furthermore, an implementation of the invention or a described further development is possible by means of a computer-readable storage medium on which a computer program is stored which the invention or the further development runs.

The invention and/or each described further development can be implemented by means of a computer program product which has a storage medium on which a computer program is stored which the invention and/or the further development runs.

The method according to the invention for the automatic adaptation of a control of a technical plant is based on control circuits for the control of the technical plant. Control circuits of this type for the control of the technical plant are initially set up—or alternatively are present as control circuits already set up.

Both are intended to be understood in the context of the invention as control circuit creation.

In setting up the control circuits, customary parameters of control circuits, such as transmission elements, time constants and/or amplification factors for the transmission elements are defined or determined.

On the basis of the control circuits that are set up, initially at least a first control circuit and a second control circuit coupled to the first control circuit are identified and selected from said control circuits, the coupling of which is effected via a process variable jointly influenced by the first and the second control circuits.

Then, taking this coupling into account, a decoupling element decoupling the first and the second control circuits is determined which has at least one adaptable parameter, for example a time constant, an amplification factor or other factors or constants.

Furthermore, in the invention, only the at least one adaptable parameter of the decoupling element is automatically adapted in an online operation of the technical plant to an actual dynamic process behavior of the technical plant (automatic online adaptation).

Here, an online operation of the technical plant is to be understood to mean that the technical plant is actually operated, for example in a normal operation of the technical plant, but also during a commissioning of the technical plant, and the actual dynamic process behavior of the technical plant is thereby generated.

The automatic online adaptation is carried out by measuring the actual dynamic process behavior of the technical plant. Furthermore, a theoretical (optimum) process behavior of the technical plant is determined through simulation using a model of the technical plant.

The at least one adaptable parameter of the decoupling element is then modified (adapted) until the actual dynamic process behavior of the technical plant corresponds to the theoretical (optimum) process behavior of the technical plant in a predefinable scope or quality.

The automatically adapted control for the technical plant is therefore then available in the invention with the first control circuit and with the second control circuit—coupled using the decoupling element having the automatically online-adapted parameter.

The determination of this decoupling element can preferably be effected initially on the basis of a theoretical decoupling element.

This theoretical decoupling element can be determined on the basis of an (actual) plant dynamic response predefined by the technical plant. In short, the theoretical decoupling element can be determined using the predefined plant dynamic response.

A theoretical decoupling element of this type decoupling the two control circuits may be a derivative lag element or a delay element.

A delay element E(s) is determined, for example in a (first-order) PT1 path with a smaller time constant TPT1 and a (third-order) PT3 path with a greater time constant TPT3 (TPT1<TPT3), by the relationship $$E(s) = \frac{1}{\left(1 + \frac{T_{PT2}}{2} \cdot s\right)^2},$$

where TPT2=TPT3−TPT1.

A derivative lag element E(S) is determined, for example in a (second-order) PT2 path with a smaller time constant TPT2 and a (third-order) PT3 path with a greater time constant TPT3 (TPT2<TPT3), for example by the relationship $$E(s) = \frac{\left(1 + \frac{T_{PT3}}{3} \cdot s\right)^3}{\left(1 + \frac{T_{PT2}}{2} s\right)^2 \cdot (1+s)}$$

Two different cases/types of reciprocal influencing in the dynamic processes and therefore in the two control circuits can thus be distinguished with the two types of decoupling elements E(S), i.e. delay element and derivative lag element, namely, on the one hand, cases of control circuits which are decoupled by elements with delay behavior, and, on the other hand, cases in which decoupling elements are required which have derivative lag characteristics.

Expressed in clear and simplified terms, the first control circuit influences—according to the given plant dynamic response—the joint process variable with a shorter-term/longer-term effect than said variable is influenced in the second control circuit, so that a derivative lag or delay element can be selected for the decoupling of the two control circuits according to this system dynamic response.

An applicability of a decoupling of this type can be improved if a noise behavior is also taken into account. In short, the decoupling should require that a noise behavior is also acceptable. Clearly expressed, the decoupling element should not (further) amplify a noise.

In particular, a theoretical decoupling element with a derivative lag characteristic (derivative lag element) tends towards precisely this noise amplification.

For this purpose, the invention can furthermore provide that the theoretical decoupling element is extended with a noise compensation element $E_R(s)$ (noise-compensated theoretical decoupling element), which at least compensates for the noise amplification from the theoretical decoupling element by means of a corresponding compensation behavior, i.e. by means of an (amplification) reduction accordingly counteracting the amplification of the theoretical decoupling element.

In particular, a noise compensation element $E_R(s)$ of this type can be determined as follows:

$$E_R(s) = \frac{1 + T_D \cdot s}{1 + T_X \cdot s}$$

Consequently, the theoretical decoupling element E(s) extended by the noise compensation element $E_R(s)$, i.e. the noise-compensated theoretical decoupling element (again E(s)), can be determined as follows:

$$E(s) = \frac{\left(1 + \frac{T_{PT3}}{3} \cdot s\right)^3}{\left(1 + \frac{T_{PT2}}{2} s\right)^2 \cdot (1+s)} \cdot \frac{1 + T_D \cdot s}{1 + T_X \cdot s}$$

Furthermore, the invention can provide that the theoretical decoupling element, in particular this noise-compensated theoretical decoupling element E(S), is extended by a reactive-current element F(s) which takes into account or eliminates a reactive-current component in the decoupling (reactive-current-compensated theoretical decoupling element or noise-compensated and reactive-current-compensated theoretical decoupling element).

Since the theoretical decoupling element or the noise-compensated theoretical decoupling element will namely itself assume a stationary value, i.e. an output signal of the theoretical decoupling element or the noise-compensated theoretical decoupling element remains on a stationary value, as a result of which a second control circuit that is to be decoupled would operate exclusively as a noise variable regulator, it can be provided that the—formerly stationary—output signal of the theoretical decoupling element of the noise-compensated theoretical decoupling element can again be reduced by means of this reactive-current element which extends the theoretical or noise-compensated theoretical decoupling element.

It can be provided in particular that this reactive-current element is adapted in such a way that a dynamic response of the reduction of the output signal of the decoupling element corresponds to a dynamic response of the second control circuit decoupled by the decoupling element from the first control circuit.

Clearly illustrated or simply expressed, to the extent that a change in the first control circuit impacts on the second control circuit and the second control circuit responds accordingly, the output signal of the decoupling element is reduced.

This can be effected through control engineering in that the transmission characteristic of the first control circuit with a negative sign is injected at the output of the theoretical decoupling element or the noise-compensated theoretical decoupling element.

In the case of the noise-compensated theoretical decoupling element, this can be described as follows:

$$E(s) - F(S) = \frac{\left(1 + \frac{T_{PT3}}{3} \cdot s\right)^3}{\left(1 + \frac{T_{PT2}}{2}s\right)^2 \cdot (1 + s)} \cdot \frac{1 + T_D \cdot s}{1 + T_X \cdot s} - \frac{1}{\left(1 + \frac{T_{PT2}}{2} \cdot s\right)^2}$$

Furthermore, the invention can provide—as the at least one parameter automatically adaptable in the online operation of the technical plant—an automatically adaptable decoupling factor V in the decoupling element, by means of which a strength of the decoupling is influenced by the decoupling element.

Particularly preferably, a decoupling factor V of this type can be provided in the noise-compensated and reactive-current-compensated theoretical decoupling element, by means of which a strength of the decoupling is then influenced by the noise-compensated and reactive-current-compensated theoretical decoupling element (adaptable noise-compensated and reactive-current-compensated theoretical decoupling element).

By means of a change—practicable in the automatic adaptation—in this decoupling factor V (automatic online adaptation), influence can thus be exerted directly on the strength of the decoupling—and therefore deviations from the theoretical, optimum transmission behavior can be compensated with the currently present decoupling element (current decoupling factor V) for the real transmission behavior.

If assumed time constants of the decoupling element do not match a real transmission path and/or if the path in reality has deviating transition characteristics, a deviation of the actual transition function from the transition function to be expected consequently also occurs.

Expressed in simplified terms, through the use of this decoupling factor V—and targeted modification of the decoupling factor V—a deviation between assumed (optimum) transmission behavior and real transmission behavior can be compensated.

A path with the adaptable noise-compensated and reactive-current-compensated theoretical decoupling element can thus be described as follows.

$$UE = V(E(s) - F(S))$$
$$= V\left(\frac{\left(1 + \frac{T_{PT3}}{3} \cdot s\right)^3}{\left(1 + \frac{T_{PT2}}{2}s\right)^2 \cdot (1 + s)} \cdot \frac{1 + T_D \cdot s}{1 + T_X \cdot s} - \frac{1}{\left(1 + \frac{T_{PT2}}{2} \cdot s\right)^2}\right)$$

Furthermore, the automatic adaptation of the adaptable noise-compensated and reactive-current-compensated theoretical decoupling element can now be effected in the invention, wherein—in the adaptation—the theoretical (optimum) process behavior is compared with the actual dynamic process behavior of the controlled process.

The strength of the decoupling, i.e. the decoupling factor V, is therefore changed (adapted) until the actual process behavior of the technical plant—measurable on the plant, for example, by means of a corresponding sensor system—corresponds to the optimum process behavior of the technical plant—determinable through simulation—at least in a predefinable measure or quality.

The predefined quality of the matching of actual and optimum process behavior of the technical plant is used here as the adaptation termination criterion.

If, for example, the deviation of the actual process behavior from the optimum process behavior falls below a predefinable limit value for a value of the decoupling factor V to be adapted, the adaptation is terminated. The last-used value of the decoupling factor V is used for the adapted control.

A limit value of this type may be expressed, for example, in the form of a dead band around the theoretical (optimum) process profile. If the actual dynamic process behavior or the actual process profile—for a specific value of the decoupling factor V—then lies within this dead band, the decoupling or control has achieved the predefined quality and the adaptation is terminated.

A dead band of this type is suitable, in particular, for being able to distinguish fundamental systematic deviations from measurement noise and other random fluctuations.

Numeric (optimization) strategies for the adaptation or modification of the decoupling factor V with corresponding termination criteria are known.

In addition, prior knowledge of how the deviation changes in the event of a change in the decoupling factor V can also be incorporated or taken into account in the adaptation.

With the control circuits—decoupled by means of the adapted decoupling element, in particular in the form of the adapted noise-compensated and reactive-current-compensated theoretical decoupling element—an automatically adapted control is available for the technical plant.

In the automation system according to the invention for controlling a technical plant, the method according to the invention is implemented in said system and is available there for the automatic adaptation according to the invention of the control of the technical plant. The automation system according to the invention for controlling a technical plant can thus also have the automatically adapted control.

This automatic adaptation according to the invention can thus be carried out, on the one hand, during commissioning of the technical plant, for example a steam power plant, but, in particular, online also, i.e. during the operation of the technical plant. A continuous adaptation of the control structures to the actual dynamic plant behavior can thereby be achieved. This means that the invention enables an adaptation of the decoupling elements in the cycle of the automation to be carried out, if required.

The invention also offers substantial advantages beyond those already specified.

Thus, higher-order decoupling elements can be implemented in the invention, whereas only first-order decoupling elements can be used in the manual parameterization. Only the invention with its automatic adaptation enables the handling of a multiplicity of parameters which can no longer be set manually with plant tests.

The achievement of the invention is therefore not only that decoupling elements no longer need to be put into operation manually. Due to the possibility of higher-order decoupling elements, a control quality is also achieved which is unachievable with the previous method.

The automatic adaptation of the control structures possible through the invention, not only during commissioning of the technical plant, but also in the operation of the technical plant, i.e. in the online operation of the technical plant, proves to be quickly practicable and therefore also extremely cost-effective.

The invention independently adapts the decoupling elements to the actual dynamic behavior of the controlled process and is therefore highly robust in relation to the specification of the plant dynamic response.

The invention can additionally be combined with an estimation algorithm which determines the dynamic response of a process in the online operation.

In addition, the invention itself only has parameters which are or can be determined offline. The invention furthermore proves to be extremely fault-tolerant in relation to incorrectly set parameters, such as time constants and transmission elements in the control circuits.

The invention also proves to be advantageous in terms of the computing outlay and storage space requirement—and is therefore extremely suitable for use in an automation system and in particular in a power plant control system.

A reduction in the commissioning duration of control structures, a reduction in the commissioning costs of control structures and an increase in the quality of the control can be implemented for the first time by means of the invention.

The previously given description of advantageous designs of the invention contains numerous features which are set out in the individual subclaims, combined in part to form a plurality. However, the person skilled in the art will also appropriately consider these features individually and combine them to form appropriate further combinations.

In particular, these features can be combined in each case individually and in any given suitable combination with the method according to the invention and/or with the device according to the respective independent claim.

BRIEF DESCRIPTION OF THE DRAWINGS

An example embodiment of the invention is shown in figures which are explained in detail below.

In the figures.

DETAILED DESCRIPTION OF INVENTION

Figure 1:
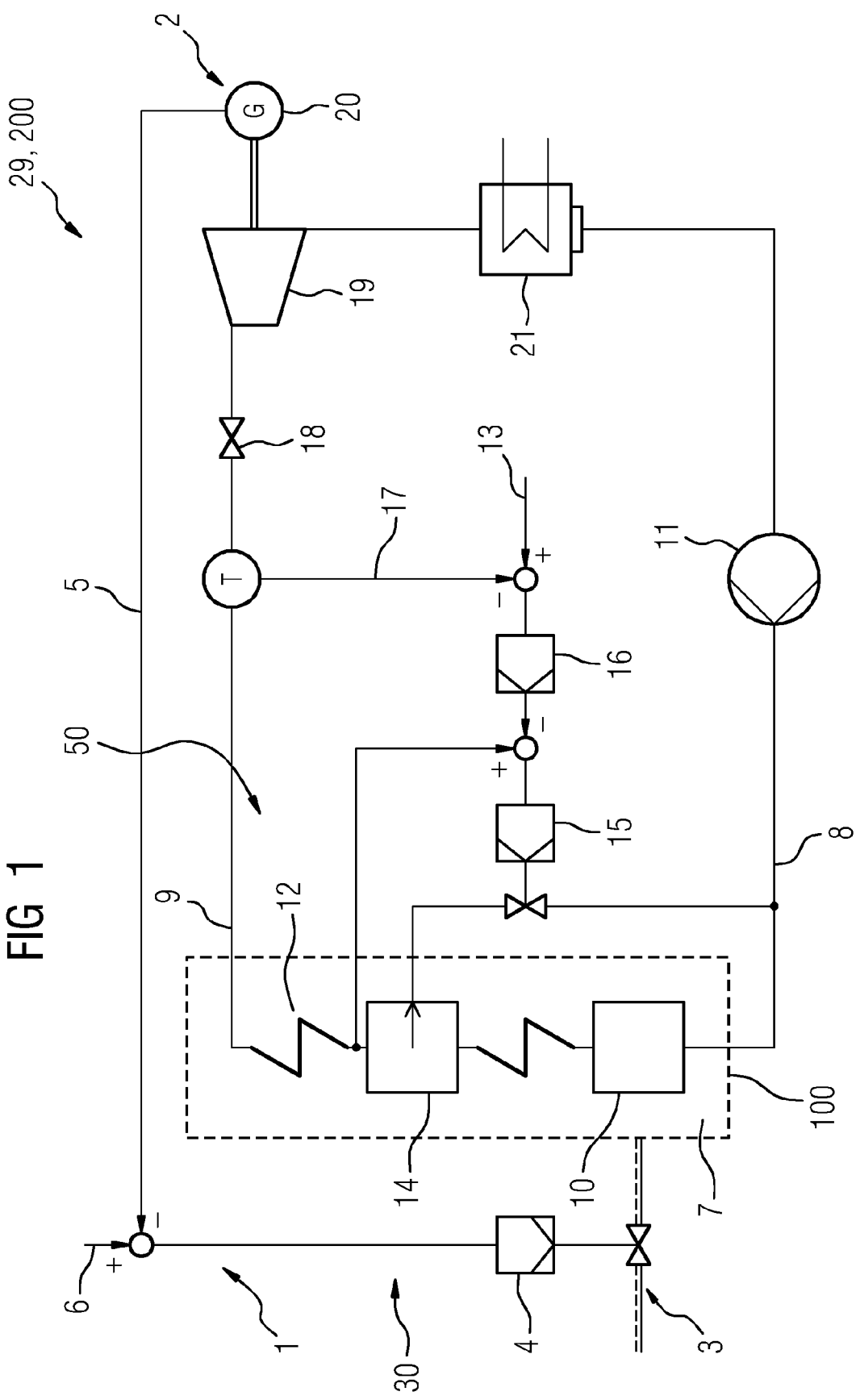
FIG. 1 shows a control engineering representation of processes in a steam power plant.

Example Embodiment: online parameter adaptation of derivative lag and delay elements in power plant control circuits Process diagram—steam generation/production of electric power in a steam power plant FIG. 1 shows, in a simplified representation, different processes 1 from a steam generation through to a production of electric power in a steam power plant (model 29 and control circuit creation 200).

As shown in FIG. 1, a required electric power 2 of the steam power plant is directly associated with the usage quantity of the fuel 3 that is used.

A controller 4 controls a supply of the fuel 3 in a furnace 7 depending on the predefined desired value 6 and the instantaneously generated electric power 5.

The area framed with the rectangle 100 in FIG. 1 comprises those points in the processes 1 in which the combustion heat acts on the feed water 8 that is used or the steam 9.

As shown in FIG. 1, the heat released from the combustion process of the fuel is used in the steam generator 10 to generate steam 9. The (feed) water 8 is fed by a feed water pump 11 to the steam generator 10 for this purpose. The temperature of the generated steam is then further increased by a superheater 12.

In order to be able to control high temperatures precisely and therefore keep them stable, an injection device 14 which can introduce feed water 8 on demand and thereby exert a cooling influence in the superheating process follows upstream of the superheater 12 which heats the steam 9 to the desired temperature 13.

The injection control 15 obtains its desired value through a higher-order controller 16, depending on the current live steam temperature 17 and the predefined live steam desired value 13.

As shown in FIG. 1, the generated live steam 9 is fed via a turbine control valve 18 to the turbine 19 of the plant, which finally makes the electric power 2 available via a generator 20 coupled to it.

If the (live) steam 9 has performed its mechanical work on the turbine 20, it is cooled via a condenser device 21 and fed in liquid form via the feed water pump 11 once more to the process or processes 1.

Coupled Control Circuits/Decoupling Cases with "Delay Characteristic" and "Derivative Lag Characteristic"

Within these spheres of activity shown in FIG. 1, two different interactions between control circuits can be identified which are based on (two) different decoupling cases ("delay characteristic", "derivative lag characteristic").

"Delay Characteristic" Decoupling Case

If—according to FIG. 1—the electric power is to be increased, the corresponding controller 4 ensures that more fuel 3 is supplied. However, the increased fuel supply means a greater steam development, wherein consequently the feed water flow 8 must similarly be increased.

The feed water mass flow is controlled by a controller depending on the evaporator outlet enthalpy of the generated steam (not shown).

Since a direct connection exists between the fuel flow 3 and the feed water flow 8, there is no need here to wait for a change in the evaporator outlet enthalpy.

The increase in the feed water 8 acts here more directly on the evaporator outlet enthalpy than the increase in the fuel mass flow 3.

The reason for this is that ultimately only an increase in the delivery rate of the feed water pump 11 is required for the increase in the feed water heat flow 8. Conversely, a longer time period elapses from the increase in the delivery rate of the fuel 3 to the final heat release in the combustion process and the transfer to the evaporator tubes.

Consequently, an increase in the feed water flow 8 must take place with a certain delay, since the heat transfer to the feed water 8 also takes place only after a delay in relation to the signal to increase the fuel mass flow 3.

In this case, a decoupling of the fuel control circuit 30 and the feed water control circuit (coupled control circuits) with a delay characteristic is therefore necessary.

"Derivative Lag Characteristic" Decoupling Case

The second, identifiable interaction between two control circuits in FIG. 1 relates to the fuel control circuit 30 and the control circuit 50 for the live steam temperature control via the injection (live steam control circuit 50) (coupled control circuits).

The feed water injection 14 upstream of the input of the superheater 12 responds to a greater heating of the steam 9 via superheater areas (not shown) only if an increase in the live steam temperature 17 is recognizable via the superimposed control circuit (cf. higher-order controller 16).

A longer time period elapses from the increase in the delivery rate of the fuel 3 to the final heat release in the combustion process and the transfer to the evaporator tubes. However, the released heat acts directly on the superheater. Conversely, the feed water injection 14 acts only on the inlet of the superheater 12 and a similarly long time period will elapse until a change in the steam temperature on the superheater inlet has impacted on the superheater outlet.

On the whole, the fuel heat flow 3 acts more quickly on the live steam temperature 17 than the feed water injection 14.

However, since an excessively high live steam temperature 17 should not occur under any circumstances, feed water 8 must be introduced as early as possible via the injection nozzles (at 14) for cooling.

The fuel control circuit 30 and the live steam control circuit 50 must be decoupled accordingly with a decoupling with a derivative lag characteristic.

Decoupling with Derivative Lag Characteristic

Even if the decoupling of the fuel control circuit 30 and the live steam control circuit 50 (decoupling with derivative lag characteristic) is explained in detail below by way of example, the person skilled in the art will apply the procedure accordingly to the decoupling of the fuel control circuit 30 and the feed water control circuit (decoupling with a delay characteristic).

Figure 2:
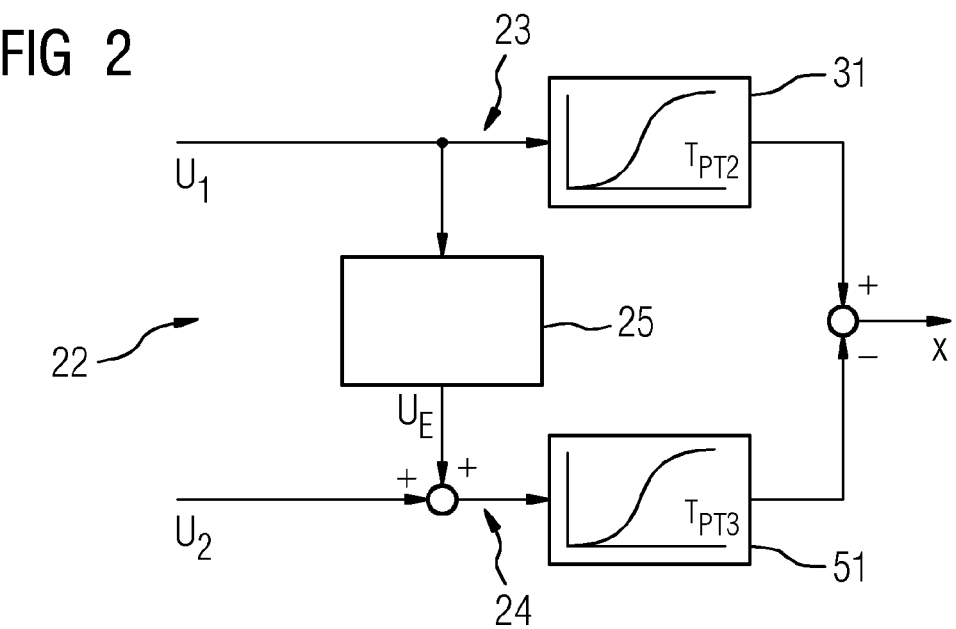
FIG. 2 shows a simplified control engineering model of process paths of two coupled control circuits (fuel control, live steam control) with a built-in decoupling element according to one example embodiment of the invention.

FIG. 2 shows a simplified control engineering model 22 of the two process paths 23, 24 of the two coupled control circuits 30, 50, i.e. of the fuel control circuit 30 and the live steam control circuit 50 (cf. FIG. 1).

As shown in FIG. 2, the transmission behavior in the fuel control circuit 30 is described by a PT2 element 31 (second-order PTn element with n as an ordinal number), the transmission behavior in the live steam control circuit 50 by a PT3 element 51 (third-order PTn element)—with corresponding, selected time constants TPT2, TPT3 and amplification factors KPT2, KPT3.

The decoupling of the two control circuits 30, 50, i.e. of the fuel control circuit 30 and the live steam control circuit 50 (cf. FIG. 1), is intended to decouple the two input variables U1 (fuel mass flow), U2 (feed water injection) in the two process paths 23, 24 from one another in such a way that the output variable x (live steam temperature) changes as little as possible.

As shown in FIG. 2, the two process paths 23 and 24 are connected for this purpose via a decoupling element 25 with a derivative lag characteristic incorporated between the two paths.

Here, the decoupling element 25 receives—as the input signal there—the input signal U1 of the signal path 23 of the fuel heat flow; the output signal UE of the decoupling element 25 is applied with summation to the input signal U2 of the signal path 24 of the feed water injection.

The model is simplified so that a linearization around the operating point is assumed, i.e. time constants of the superheater 12 are considered as constant.

Furthermore, the measurement delay is shifted into the individual delays of the two input signals U1 and U2.

The assumption of the PT2 element 31 for the signal path 23 of the fuel heat flow and the assumption of the PT3 element for the signal path 24 of the feed water injection (on the basis of the desired value for the temperature downstream of the injection device 14) represents an approximation to the actual delay elements.

Furthermore, the superimposed live steam controller has been ignored (cf. FIG. 1) and it has been assumed that the input signal U2 does not change if U1 changes.

The decoupling element 25 is described by $$E(s)=E1(s)*E2(s)$$

with E1(s) as the theoretical decoupling element and E2(s) as the noise compensation, wherein $$E_1(s) = \frac{\left(1 + \frac{T_{PT3}}{3} \cdot s\right)^3}{\left(1 + \frac{T_{PT2}}{2}s\right)^2 \cdot (1+s)}$$

$$E_2(s) = \frac{1 + T_D \cdot s}{1 + T_X \cdot s}$$

Here, E2(s) forms a (noise) compensation element which compensates for the noise amplification of the "ideal" decoupling element E1(s).

The parameter TD represents the inverse of the amplification of E1(s). The parameter Tx is selected as a percentage value of this amplification. The percentage amount of the amplification is determined in such a way that no noise amplification occurs in each case for different path time constants and relationships.

Figure 3:
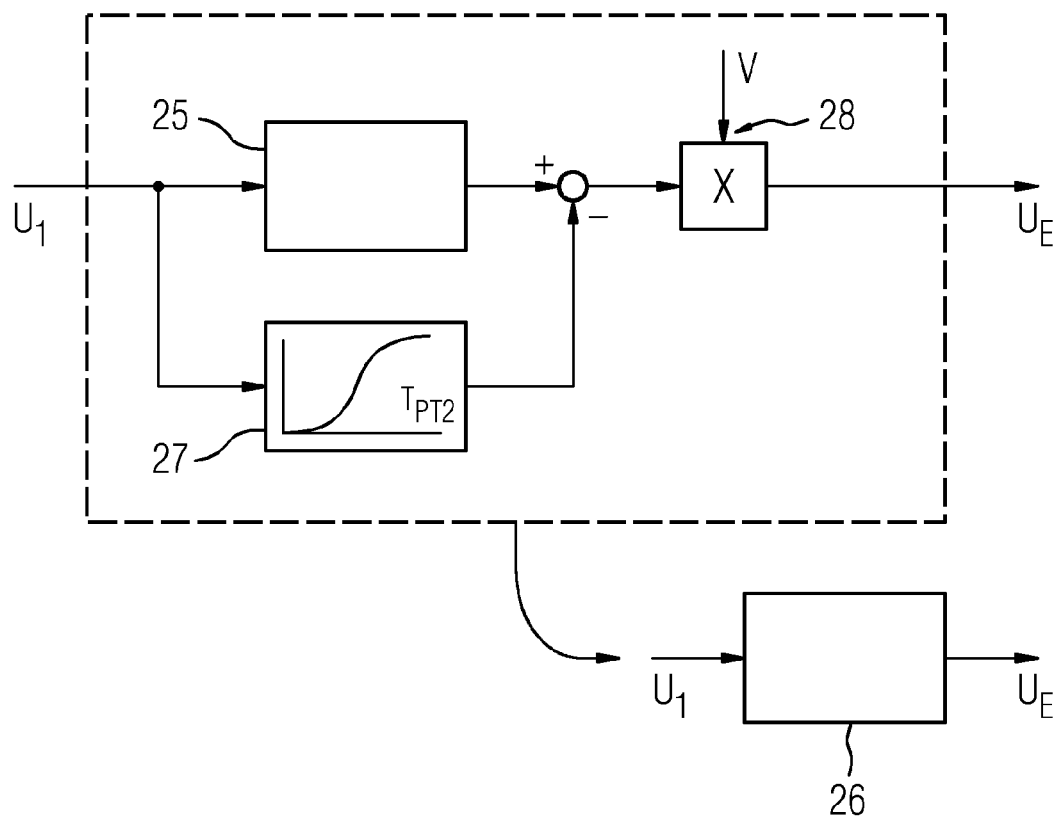
FIG. 3 shows a block diagram of an adapted decoupling between a first process variable (fuel heat flow) and a second process variable (live steam temperature) according to the example embodiment of the invention.

FIG. 3 shows—on the basis of the decoupling according to FIG. 2—an adapted decoupling 26 which takes into account that the output signal UE of the decoupling element 25 must not have a stationary value, but rather must fade once more after a certain time.

The time in which and the characteristic with which this reduction/fading is to take place in this case can be estimated as follows.

If the fuel heat flow 3 changes, the live steam temperature 17 changes without an intervention of the superimposed controller 16 with a dynamic response which is predefined by the heat transfer process of the superheater 12 described as a model.

In precisely this dynamic response, the superimposed controller 16 will be able to accept the default value of a modified injection, for which reason the output signal UE of the decoupling element 25 is intended to be reduced with this dynamic response.

Assuming that the effect relationship of the fuel heat flow 3 on the live steam temperature 17 can be characterized by a PT2 behavior, the withdrawal of the stationary final value, as shown in FIG. 3, will therefore be effected by a PT2 element 27 with the determined time constant for the specified effect relationship.

If the assumed time constants TPT2, TPT3 do not match the real path or if the path in reality has deviating transition characteristics (deviating from the assumed PTn elements), a deviation from the expected transition function (U1/UE) consequently also occurs.

For this purpose, as shown in FIG. 3, an adaptable decoupling factor V 28, which compensates for a deviation of the path from the assumed model, is applied to the previous model.

FIG. 3 can be expressed in control engineering terms as follows.

$$UE = V(E(s) - F(S))$$

$$= V \left( \frac{\left(1 + \frac{T_{PT3}}{3} \cdot s\right)^3}{\left(1 + \frac{T_{PT2}}{2} s\right)^2 \cdot (1 + s)} \cdot \frac{1 + T_D \cdot s}{1 + T_X \cdot s} - \frac{1}{\left(1 + \frac{T_{PT2}}{2} \cdot s\right)^2} \right)$$

Figure 4:
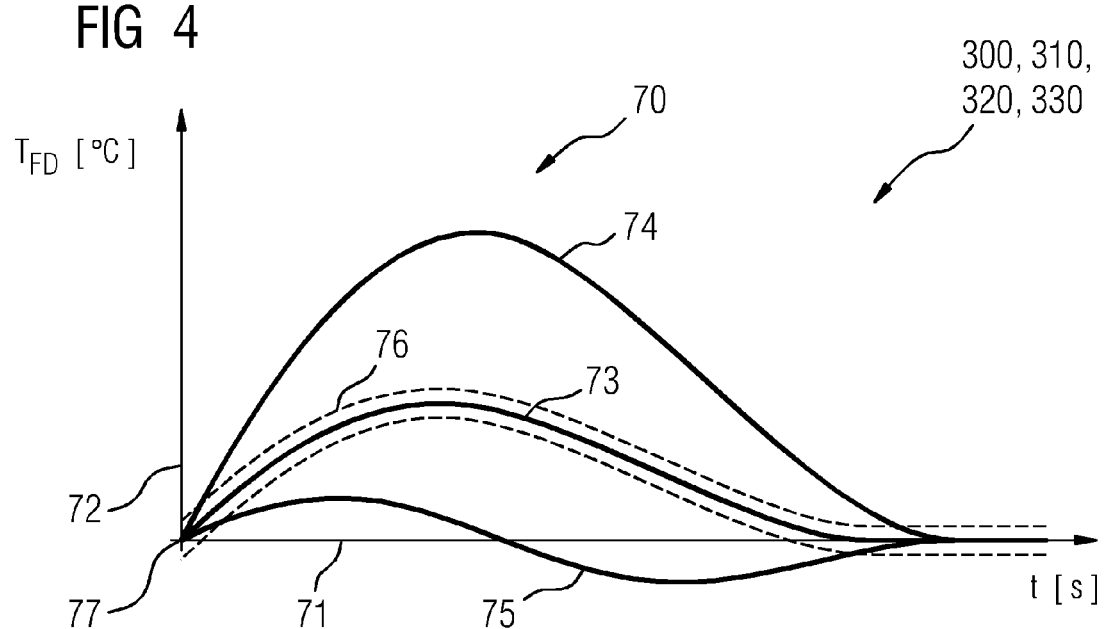
FIG. 4 shows an overview of characteristics of possible transition functions with incorrect assumption of decoupling parameters or path characteristics in the case of a permanently assumed decoupling factor V according to the example embodiment of the invention.

Automatic adaptation of the adapted decoupling element (FIG. 4, 300, 310, 320, 330)

An adaptation algorithm then automatically adapts this decoupling factor V.

To adapt the decoupling factor V 28, the optimum process behavior 73 is compared with the actual behavior 74, 75 of the controlled process for this purpose. The need then arises therefrom for an increase or reduction of V 28.

The decoupling factor V 28 is then—automatically—reduced or increased (automatic adaptation of the decoupling) until the actual process behavior 74, 75 corresponds to the optimum process behavior 73.

FIG. 4 illustrates how the adaptation of the decoupling factor V is carried out (300, 310, 320, 330).

FIG. 4 shows—in coordinate representation 70—an overview of characteristics of possible transition functions 74, 75 in the case of an incorrect assumption of decoupling parameters or path characteristics with a permanently assumed decoupling factor V. The x-axis 71 is the time (t); the y-axis 72 is the live steam temperature process parameter.

As shown in FIG. 4, the existing, assumed model and the expected transition function are considered as the reference signal/characteristic 73.

The decision is then made on the basis of this reference characteristic 73 concerning the manner in which—and the extent to which—the decoupling factor V 28 must be changed.

The reference signal 73 is always on one side of the current desired value 77 (here live steam temperature desired value 77) of the live steam control circuit 50 and therefore has no undershoots.

With the reference curve shape 73, FIG. 4 shows, by way of example for the considered process of the interrelation of fuel heat flow and feed water injection 30, 50, a possible determined reference signal 73, which is determined from the assumed model (cf. FIG. 3) and the path parameters regarded as given.

As further illustrated in FIG. 4, a dead band 76 is placed around the reference signal 73. It is thereby possible to be able to distinguish fundamental systematic deviations from measurement noise or other random fluctuations.

With a decoupling factor V (initially) assumed to be random, the two extreme cases illustrated by the two curve shapes 74, 75 may then occur.

If the decoupling factor V is initially selected as too great (75), and the decoupling circuit therefore too strong, an undershoot then occurs and the curve shape 75 lies below the reference signal 73.

If the decoupling factor V is too small (74), the calculated decoupling element has too low a decoupling strength and the amplitude of the actual signal characteristic 74 is greater than that of the reference signal 73.

The rules determining when the decoupling factor V must be increased and when it must be reduced are then derived therefrom.

V must be increased if:
  the real live steam temperature is outside the dead band 76, and
  the amount of the measured live steam temperature is greater than that of the model, and
  the real live steam temperature and that of the model have the same sign.

V must be reduced if:
  the real live steam temperature is outside the dead band 76, and
  the real live steam temperature and that of the model have different signs.

According to these rules, the decoupling factor is modified until the actual process behavior corresponds to the optimum process behavior, i.e. until the actual characteristic is located in the dead band 76.

Figure 5:
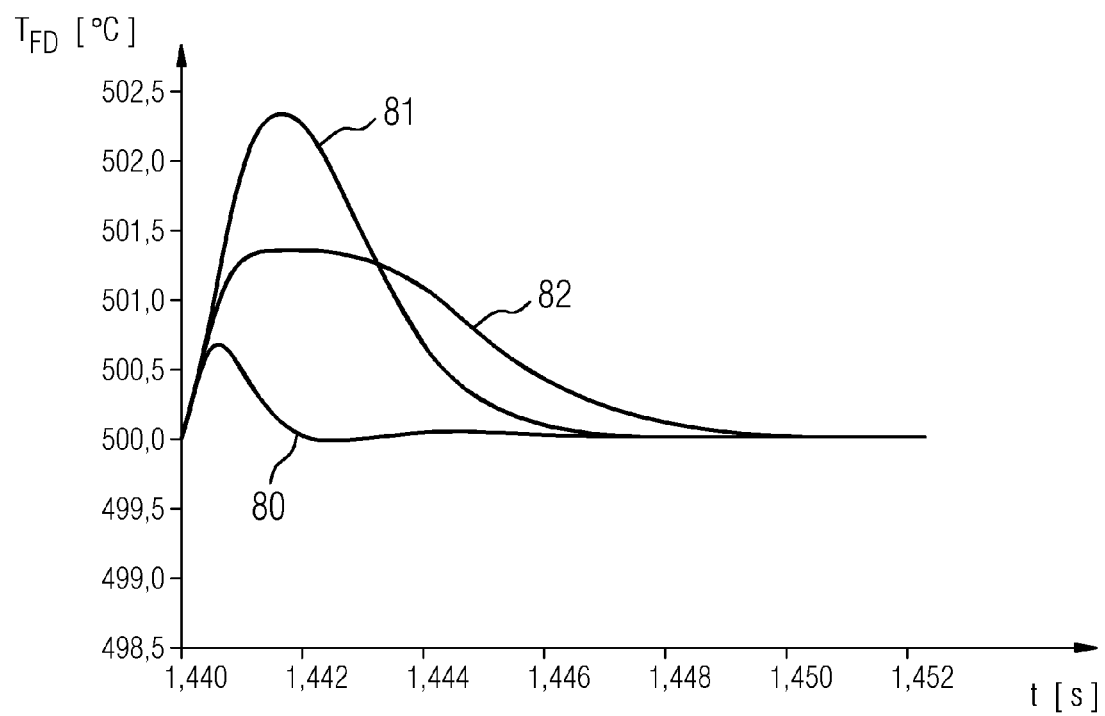
FIG. 5 shows characteristics of different transition functions (without decoupling, with empirically determined decoupling, with decoupling according to the invention) of the second process variable (live steam temperature) with an abrupt change in the first process variable (fuel heat flow) according to the example embodiment of the invention.

FIG. 5 compares different characteristics 80, 81, 82 of different transition functions (without decoupling 81, with empirically determined decoupling 82, with decoupling according to the invention 80) of the live steam temperature with an abrupt change in the fuel heat flow.

The characteristic 80 shows the transition function which occurs in the event of a completely determined decoupling factor V by the adaptation algorithm. The curve shape 80 has the required shape and no undershoot occurs.

The characteristic 81 shows the transition function without decoupling; the characteristic 82 shows the transition function with manual or empirical parameter adaptation. Both characteristics 81, 82 indicate a lower control quality compared with the automatically adapted control.

Although the invention has been illustrated and described more precisely and in detail by the preferred example embodiments, the invention is not restricted by the disclosed examples, and other variants can be derived therefrom by the person skilled in the art without exceeding the protective scope of the invention.

The invention claimed is:

1. A method for the automatic adaptation of a technical plant control,
  in which control circuits are created for the control of the technical plant, in which at least a first control circuit and a second control circuit are decoupled using a decoupling element which has at least one adaptable parameter, and
  the at least one adaptable parameter of the decoupling element is automatically adapted in an online operation of the technical plant to an actual dynamic process behavior of the technical plant, the method comprising:

measuring the actual dynamic process behavior of the technical plant, determining a theoretical optimum process behavior of the technical plant through simulation using a model of the technical plant, and modifying the at least one adaptable parameter of the decoupling element until the actual dynamic process behavior of the technical plant corresponds to the theoretical optimum process behavior of the technical plant in a predefinable scope or quality wherein the decoupling element comprises a reactive-current element adapted in such a way that an output signal of a noise-compensated theoretical decoupling element is reduced to the extent that a change in the first control circuit impacts on the second control circuit and the second control circuit responds accordingly.

2. The method according to claim 1, wherein the decoupling element contains a derivative lag or delay element.

3. The method according to claim 1, wherein the decoupling element comprises the noise-compensated theoretical decoupling element.

4. The method according to claim 1, wherein an automatically adaptable decoupling factor is taken into account in the decoupling element as the at least one parameter automatically adapts in the online operation of the technical plant wherein the decoupling factor is a strength of the decoupling.

5. The method according to claim 1, wherein a dead band is taken into account in the automatic online adaptation in the theoretical optimum process behavior of the technical plant.

6. The method according to claim 1, wherein the technical plant is a power plant.

7. The method according to claim 1, further comprising automatic decoupling of the first and the second control circuit.

8. The method according to claim 1, wherein adaptation of the control is implemented in a commissioning of the technical plant and/or during an operation of the technical plant.

9. The method according to claim 1, wherein the decoupling element is determined using a predefined dynamic response.

10. The method according to claim 1, wherein the automatic online adaptation is terminated when the actual dynamic process behavior lies in a dead band that is taken into account in the theoretical optimum process behavior.

11. The method in according to claim 1, wherein the technical plant is a steam power plant.

12. A system with a control for a technical plant, the system comprising:
a decoupling element having at least one adaptable parameter wherein the at adaptable parameter of the decoupling element is automatically adapted in an online least one operation of the technical plant to an actual dynamic process behavior of the technical plant;
control circuits of the technical plant, in which at least a first control circuit and a second control circuit are decoupled using the decoupling element;
a sensor system measuring the actual dynamic process behavior of the technical plant; and
an automation system to determine a theoretical optimum process behavior of the technical plant through simulation using a model of the technical plant, and modify the at least one adaptable parameter of the decoupling element until the actual dynamic process behavior of the technical plant corresponds to the theoretical optimum process behavior of the technical plant in a predefinable scope or quality wherein the decoupling element comprises a reactive-current element adapted in such a way that an output signal of a noise-compensated theoretical decoupling element is reduced to the extent that a change in the first control circuit impacts on the second control circuit and the second control circuit responds accordingly.

13. The system according to claim 12, wherein the decoupling element contains a derivative lag or delay element.

14. The system according to claim 12, wherein an automatically adaptable decoupling factor is taken into account in the decoupling element as the at least one parameter automatically adapts in the online operation of the technical plant wherein the decoupling factor is a strength of the decoupling.

15. The system according to claim 12, wherein a dead band is taken into account in the automatic online adaptation in the theoretical optimum process behavior of the technical plant.

16. A system with a control for a technical plant, the system comprising:
a decoupling element having at least one adaptable parameter wherein the at least one adaptable parameter of the decoupling element is automatically adapted in an online operation of the technical plant to an actual dynamic process behavior of the technical plant;
control circuits of the technical plant, in which at least a first control circuit and a second control circuit are decoupled using the decoupling element; and
an automation system to determine a theoretical optimum process behavior of the technical plant through simulation using a model of the technical plant, and modify the at least one adaptable parameter of the decoupling element until an actual dynamic process behavior of the technical plant corresponds to the theoretical optimum process behavior of the technical plant in a predefinable scope or quality wherein the decoupling element comprising a derivative lag element.

17. The system according to claim 16, wherein the automatic online adaptation is terminated when the actual dynamic process behavior lies in a dead band that is taken into account in the theoretical optimum process behavior.

18. The system according to claim 16, wherein the technical plant is a steam power plant.

19. The system according to claim 16, wherein the decoupling element comprises a reactive-current element adapted in such a way that an output signal of a noise-compensated theoretical decoupling element is reduced to the extent that a change in the first control circuit impacts on the second control circuit and the second control circuit responds accordingly.

* * * * *